US010849311B1

(12) United States Patent
Mulvey et al.

(10) Patent No.: US 10,849,311 B1
(45) Date of Patent: Dec. 1, 2020

(54) IN AND OUT PLAYHOUSE FOR CATS

(71) Applicant: Eugene Mulvey, Bradenton, FL (US)

(72) Inventors: Eugene Mulvey, Bradenton, FL (US); Lisa D'Ambrosio, Land O Lakes, FL (US)

(*) Notice: Subject to any disclaimer, the term of this patent is extended or adjusted under 35 U.S.C. 154(b) by 26 days.

(21) Appl. No.: 16/158,824

(22) Filed: Oct. 12, 2018

Related U.S. Application Data

(60) Provisional application No. 62/571,931, filed on Oct. 13, 2017.

(51) Int. Cl.
*A01K 1/03* (2006.01)

(52) U.S. Cl.
CPC .................... *A01K 1/033* (2013.01)

(58) Field of Classification Search
CPC . A01K 1/02; A01K 1/03; A01K 1/031; A01K 1/032; A01K 1/033; A01K 1/034; A01K 1/0245; A01K 1/0254
USPC ....... 119/482, 484, 485, 165, 452; D30/108, D30/114, 119; 47/40, 60
See application file for complete search history.

(56) References Cited

U.S. PATENT DOCUMENTS

| 4,445,459 A * | 5/1984 | Julie ................... A01K 1/0236 119/28.5 |
| 4,989,546 A * | 2/1991 | Cannaday ............. A01K 1/033 119/484 |
| 5,167,202 A * | 12/1992 | Bradford ................ A01K 1/035 119/452 |
| 5,469,807 A * | 11/1995 | Kosmaczeska ........ A01K 1/033 119/484 |
| 5,522,344 A * | 6/1996 | Demurjian ............. A01K 1/033 119/474 |
| 5,842,438 A * | 12/1998 | Messmer ............. A01K 1/0107 119/165 |
| 5,975,017 A * | 11/1999 | Cameron ............... A01K 1/033 119/165 |
| 6,401,663 B1 * | 6/2002 | Meier, Jr. ................. A01K 1/03 119/452 |
| 6,944,990 B2 * | 9/2005 | Noyes ....................... E06B 7/32 119/484 |
| 9,388,999 B2 * | 7/2016 | De Jesus ................... E06B 7/28 |
| 2010/0175631 A1 * | 7/2010 | Bennatt .................. A01K 1/033 119/472 |

* cited by examiner

Primary Examiner — William V Gilbert

(57) ABSTRACT

This is a multi-level outdoor enclosure for cats that mounts through the window and allows the cats access to an outdoor environment. It is designed in such a way that it will fit any sash type window and installs in minutes with no tools needed. The system consists primarily of a frame and two wire cages commonly used for pets. The frame extends through the window and bends 180 degrees so the ends of the frame rest against the interior wall. The other end of the frame forms a "C" shape and the lower end rests against the exterior wall. It also serves to enclose the lower cage securely attached to the frame. Mounted on top of this base cage is a second cage that is level with the window opening and can be moved into the window opening. This upper cage has a "cat flap door" that allows the animals to enter the cage while sealing the HVAC conditions within the room. There is an opening in the upper cage floor that allows the animals to move from one level to the other.

1 Claim, 7 Drawing Sheets

IN AND OUT PLAYHOUSE FOR CATS

BACKGROUND OF THE INVENTION

Domestic cats and other small animals are normally housed inside. Many communities have laws limiting the ability to let animals roam free, additionally allowing pets to roam free also exposes the animals to harm from predators, autos and other dangers. House pets, especially cats, prefer to be outside and consequently spend much of their time on window sills looking out. Several inventions have been developed to address this, but for the most part they strive to protect the animal from the outside elements entirely. Many serve to also house liter boxes which compounds the need to protect the interior from the outside environment. U.S. Pat. No. 51,165,366, granted to Harvey and US Patent # are such enclosures. Their primary function is to house liter boxes and afford limited area for the cats to use. Similarly U.S. Pat. No. 7,614,363 granted to Di Angelo incorporates an opaque fabric canopy with unspecified number of transparent windows. U.S. Pat. No. 6,253,711 granted to Shibles et al. also incorporates limited windows for the animals to look out. U.S. Pat. No. 5,782,205 granted to Veras offers transparent walls but allows limited space for a cat to anything but enter and sit down. In contrast, the present invention is made entirely of wire mesh screen so the animal(s) are totally immersed in the outdoors and are truly outside. In case of rain or extreme heat or cold, they simply go back in the house. The present invention is mounted in a window and separated from the interior HVAC conditions by a flap door. Mounting or dismounting the apparatus should take less than a half hour and requires no tools.

INSTALLATION OF PLAYHOUSE

1. When the customer receives the playhouse the lower cage is attached securely to the frame The customer opens the window and lifts the unit into the window, centering it in the opening as much as possible. The lower portion of the frame can be adjusted at this time (3) in FIG. 2. The customer aligns the frame (1) & (2) to be parallel with the house wall. This adjustment is made at the telescoping end as shown in FIG. 1 using clevis pins supplied. This adjustment compensates for different wall thicknesses determined by construction material. At this point the lower cage is in position as shown in FIG. 3. The smaller cage is then placed on top of the lower cage frame. The customer then attaches the angle brackets, with wing nuts supplied, to prevent any sideways movement. The smaller upper cage then slides along the frame into the window opening, the window is closed down on the cage, and the expandable sides are extended to seal the space on the sides.
2. The apparatus is now ready for use. The cats enter from the house through the flap door installed on the upper cage. They can access the lower cage via the hole provided in the floor of the upper cage. The solid floor in the upper cage provides shade for much of the lower cage so the cat can choose sun or shade.

DETAILED DESCRIPTION OF DRAWINGS

This is a multi-level outdoor enclosure that mounts in the window and allows the cats access to an outdoor environment. It is designed in such a way that it will fit any sash window and installs in minutes with no tools needed.

Figure 1:
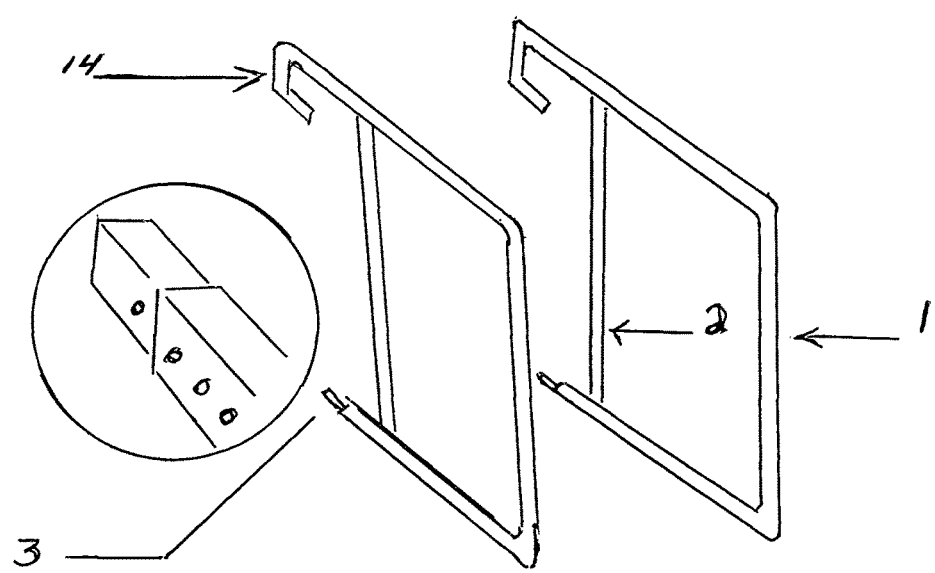
FIG. 1 depicts the frame.

(FIG. 1) One main component consists of 2 or more mounting frames for each unit (1) being a one continuous frame bent in such a way extend through the open window, bending down and around to meet the inside wall as a hook (14). The opposite end of this frame (3) is adjustable to compensate for different wall thicknesses. An additional bar (2) is attach to the main frame (1) to strengthen it on the inside.

Figure 2:
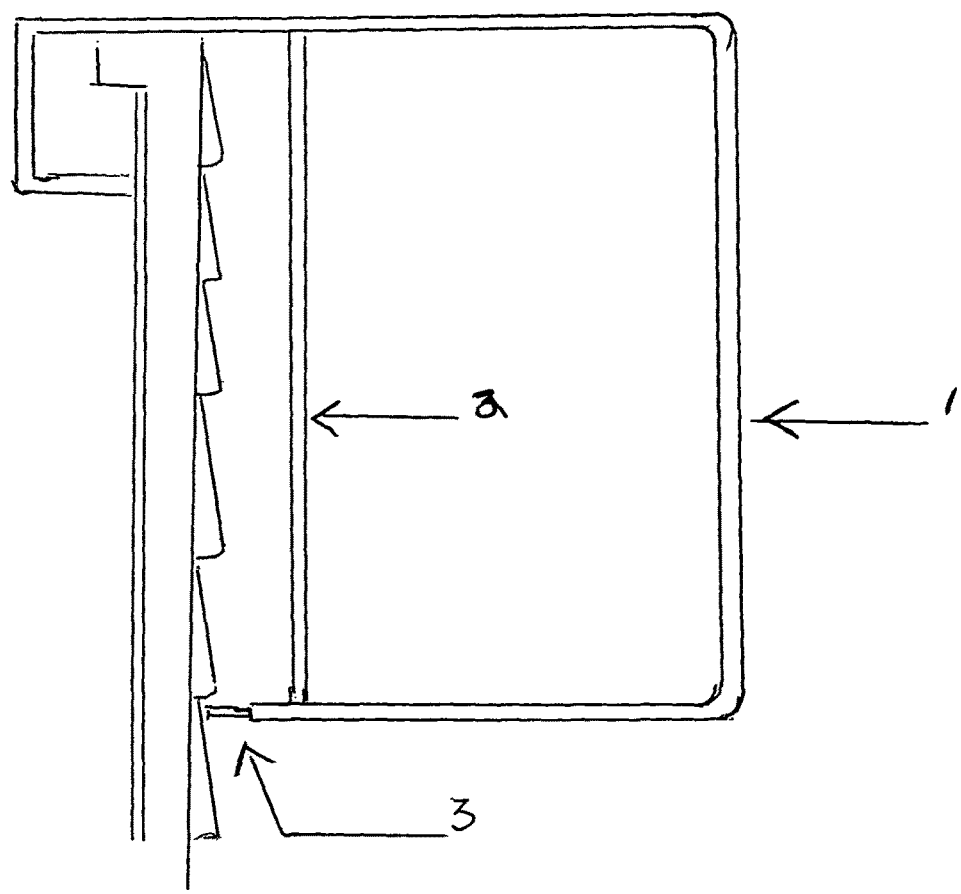
FIG. 2 Depicts the frame mounted in an open window.

(FIG. 2) depicts the frame from a side view as it extends through the open window and the bottom (3) rests against the outside wall.

Figure 3:
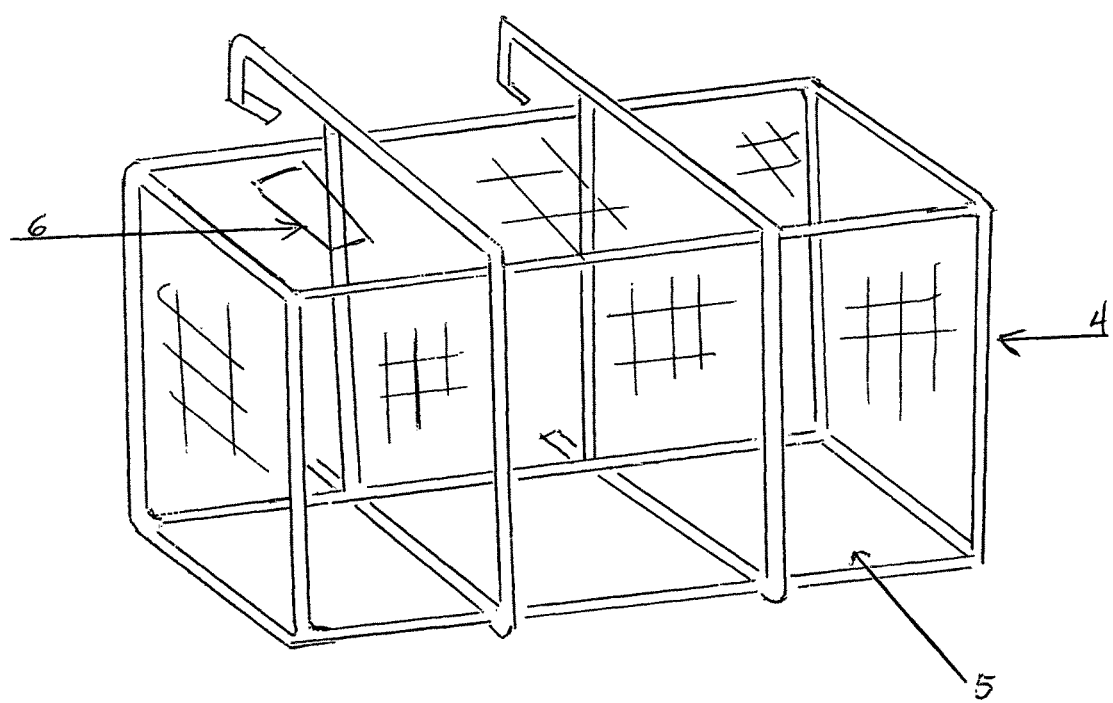
FIG. 3 depicts a lower cage mounted in frame.

(FIG. 3) shows the lower cage (4) mounted inside the frame. The cage (4) consists of four sides and a top of wire mesh and a solid floor(5). A hole is in the top (6) to allow access from the top.

Figure 4:
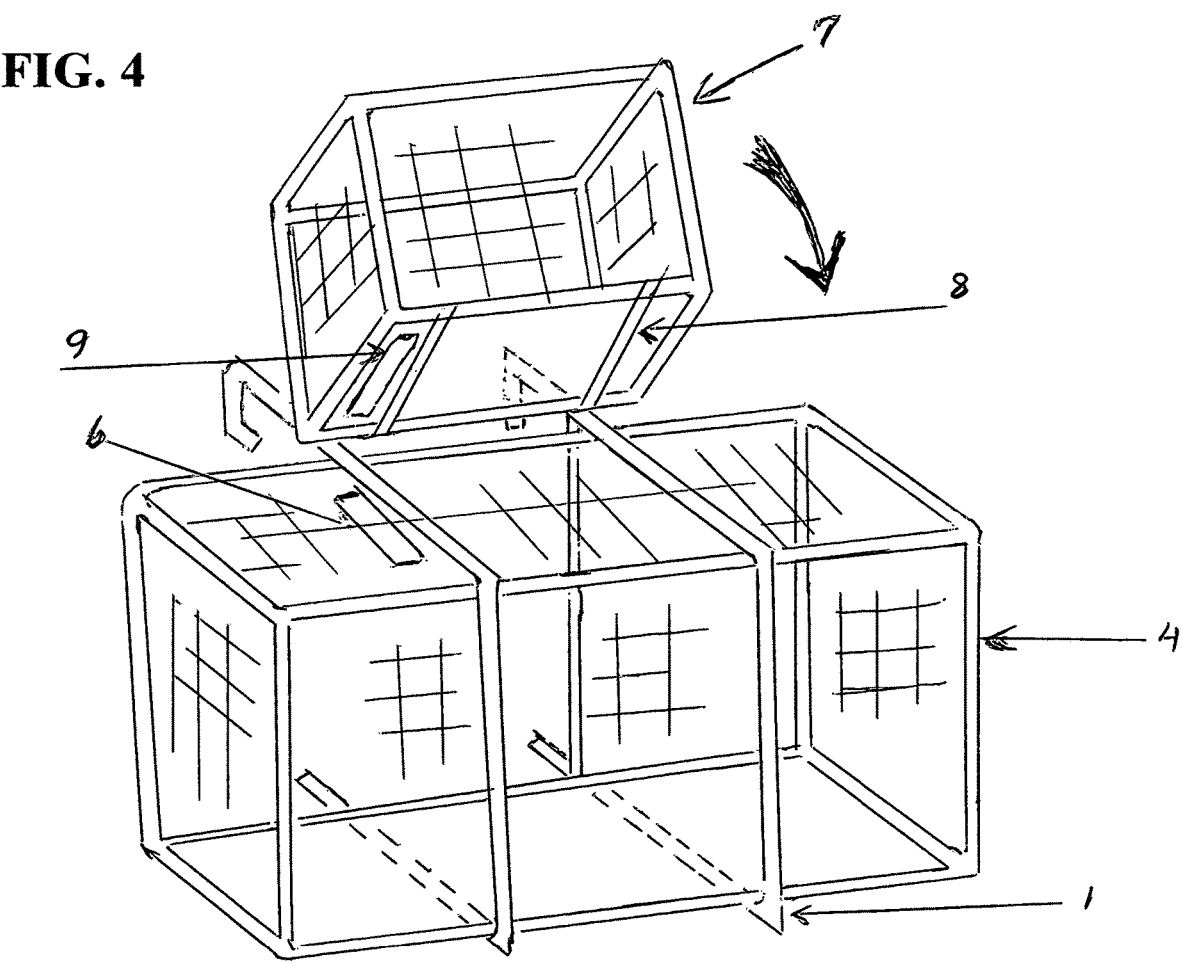
FIG. 4 depicts a upper frame positioned on a lower frame.

(FIG. 4) shows the upper cage (7) This is a smaller version of the lower cage (4) and consists of three sides and top of wire mesh, one side Plexiglass, and a solid floor. Attached to the bottom of this upper cage are two square pipes (8) that align with the frame. There is a hole cut in the floor (9) that corresponds to the hole in the hole in the top of the lower cage (6) to allow cats to move from cage to cage.

Figure 5:
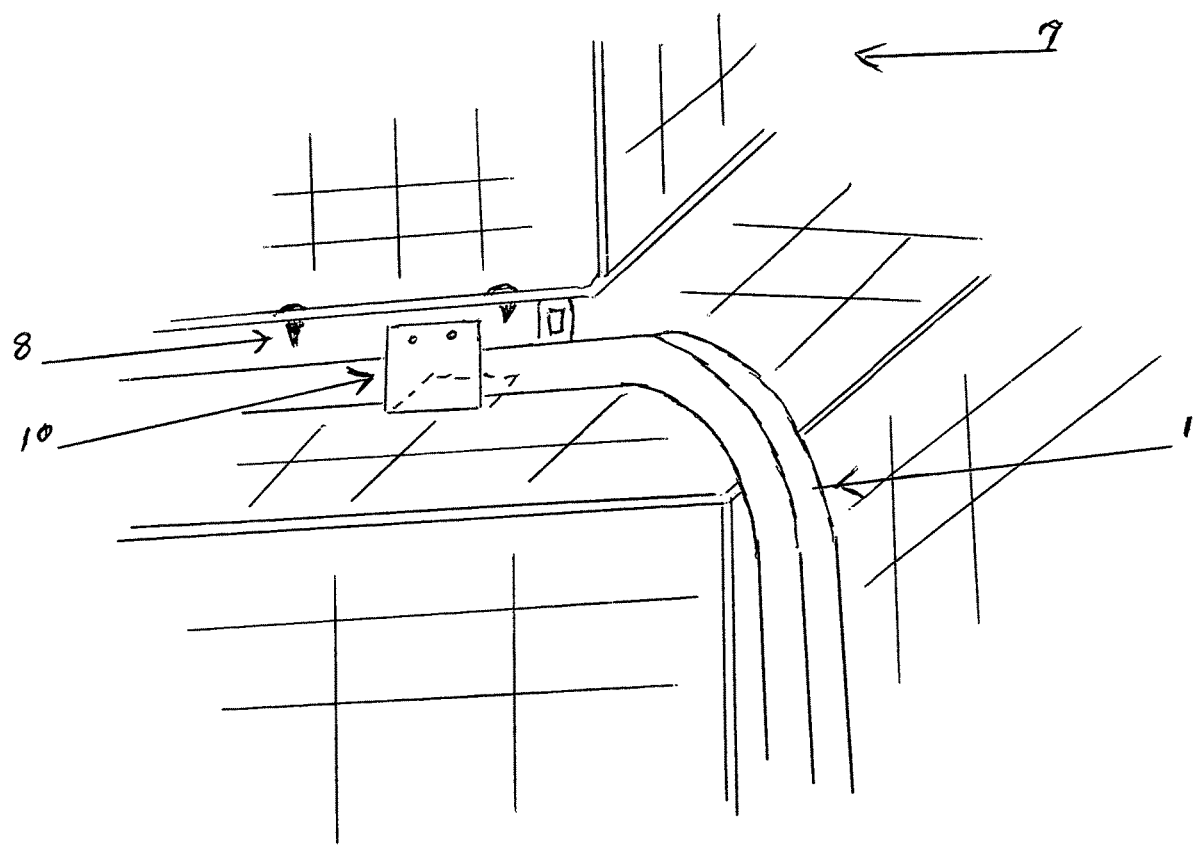
FIG. 5 depicts angle brackets attached to upper frame and engulf frame.

(FIG. 5) Once the upper cage (7) is lowered down on the frame (1), angle brackets (10) are attached to the side of the upper track (8) that wrap around the lower frame (1). This fastens the two together, but allows the upper cage to slide in and out so it can fit any window or wall thickness.

Figure 6:
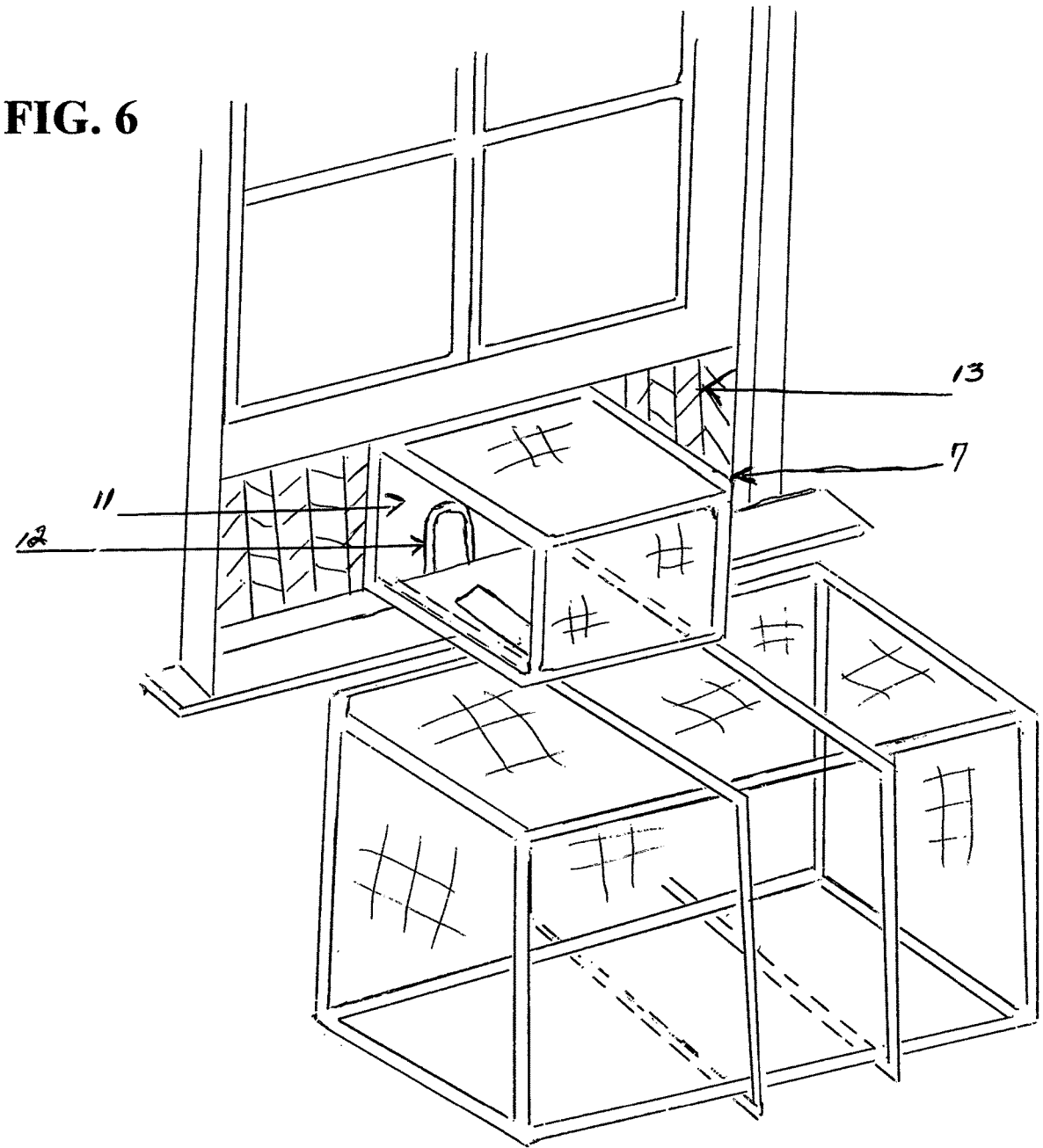
FIG. 6 depicts outside view of invention mounted in open window.

(FIG. 6), The upper cage (7) is modified as follows. The side facing the house is solid Plexiglas (11) with a swinging door hinged at the top (12) installed. This effectively isolates the In & Out Playhouse from the outside elements while allowing access by the cat(s). The window can be closed down on the unit allowing for any height window. The sides are sealed with accordion type expandable sides commonly used for window air conditioners (13). This allows the unit to fit any width window.

Figure 7:
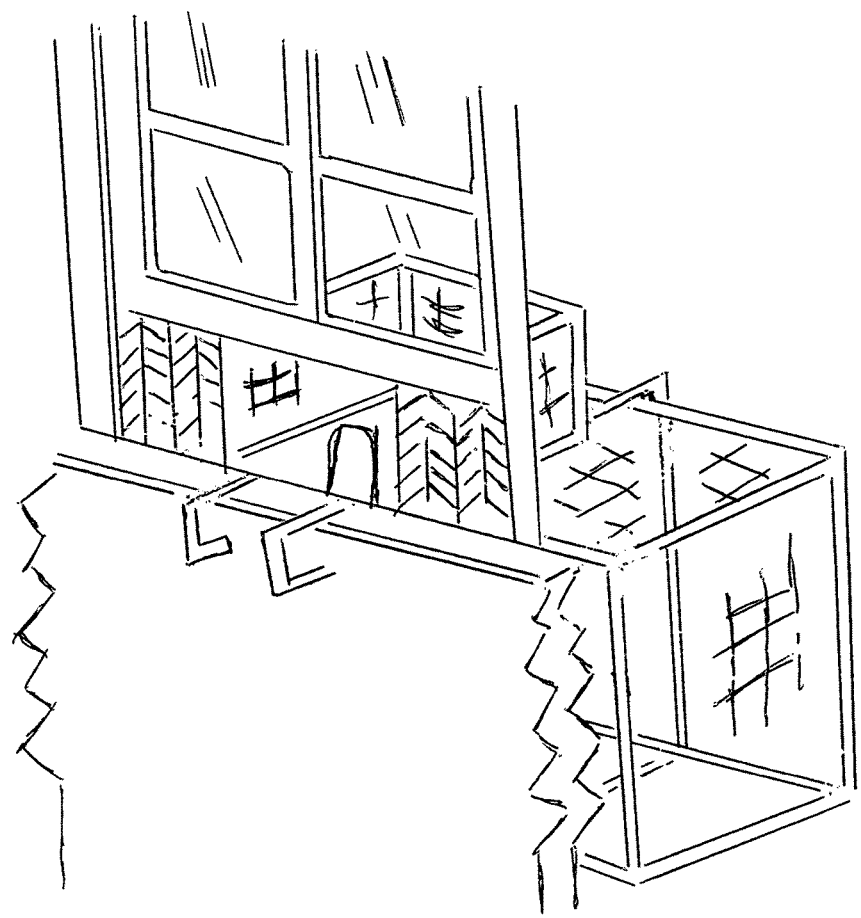
FIG. 7 depicts inside view of invention mounted in open window.

(FIG. 7) shows the installed unit from inside the house. The unit is flush with the window, completely sealed from the outside elements. The only thing extending into the room is the frame.

The invention claimed is:

1. An enclosure configured to be mounted in a window opening, comprising:
    a first enclosure having a top surface, a bottom surface opposite said top surface, a first end surface, a second end surface opposite said first end surface, a first side surface and a second side surface opposite said first side surface, said top surface having a hole extending therethrough;
    a frame comprising two frame members, each said frame member having a first segment configured to extend across said top surface of said first enclosure, a second segment extending across said first side surface and a third segment extending across said bottom surface and terminating at an end extending beyond said second side surface, said first portion having a first end extending beyond said second side surface, said first end having an end portion with a first part and a second part forming a hook, each said frame member further having a second member extending from said first segment to said third segment such that said first enclosure fits within said respective first segments, said respective second segments, said respective third segments and said respective second members;

a second enclosure being smaller than said first enclosure, said second enclosure having a top surface, a bottom surface opposite said top surface, a first end surface, a second end surface opposite said first end surface, a first side surface and a second side surface opposite said first side surface, said bottom surface of said second enclosure having a hole corresponding to said hole of said top surface of said first enclosure, said bottom surface of said second enclosure further having a first square pipe and a second square pipe configured to rest on a top surface of a respective said first segment.

\* \* \* \* \*